United States Patent
Mentze et al.

(10) Patent No.: US 6,601,094 B1
(45) Date of Patent: Jul. 29, 2003

(54) METHOD AND SYSTEM FOR RECOMMENDING AN AVAILABLE NETWORK PROTOCOL

(75) Inventors: Duane Mentze, Roseville, CA (US); Fernando Juliao, Davis, CA (US); Cameron Brodeur, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/558,993

(22) Filed: Apr. 27, 2000

(51) Int. Cl.7 .............................. G06F 15/177
(52) U.S. Cl. .............. 709/220; 709/222; 709/221; 709/227; 709/230
(58) Field of Search .................. 709/230, 232, 709/237, 220, 221, 227, 224, 228

(56) References Cited

U.S. PATENT DOCUMENTS

| | | | |
|---|---|---|---|
| 5,517,622 A | * | 5/1996 | Ivanoff et al. .............. 709/232 |
| 5,596,723 A | * | 1/1997 | Romohr ...................... 709/222 |
| 5,710,908 A | * | 1/1998 | Man ........................... 709/232 |
| 5,999,979 A | * | 12/1999 | Vellanki et al. ............. 709/230 |
| 6,324,582 B1 | * | 11/2001 | Sridhar et al. .............. 709/230 |

FOREIGN PATENT DOCUMENTS

| | | | | |
|---|---|---|---|---|
| EP | 0713310 A2 | | 5/1996 | .......... H04L/29/06 |
| WO | WO 97/29563 | * | 1/1997 | |

* cited by examiner

*Primary Examiner*—Ario Etienne
*Assistant Examiner*—Abdullahi Elmi Salad

(57) ABSTRACT

A method and system for recommending an available network protocol operatively connected to at least one client computer via a network. The method includes the steps of determining whether a first network protocol in a network protocol list having a number of types of network protocols is supported by the client computer and the peripheral device, verifying communication between the client computer and the peripheral device over the network protocol when the network protocol is supported by the client computer and the peripheral device, determining whether a next network protocol in the network protocol list is supported by the client computer and the peripheral device when the first network protocol is not supported by the client computer and the peripheral device, and recommending the network protocol with verified communication to the user.

11 Claims, 2 Drawing Sheets

METHOD AND SYSTEM FOR RECOMMENDING AN AVAILABLE NETWORK PROTOCOL

Figure 1:
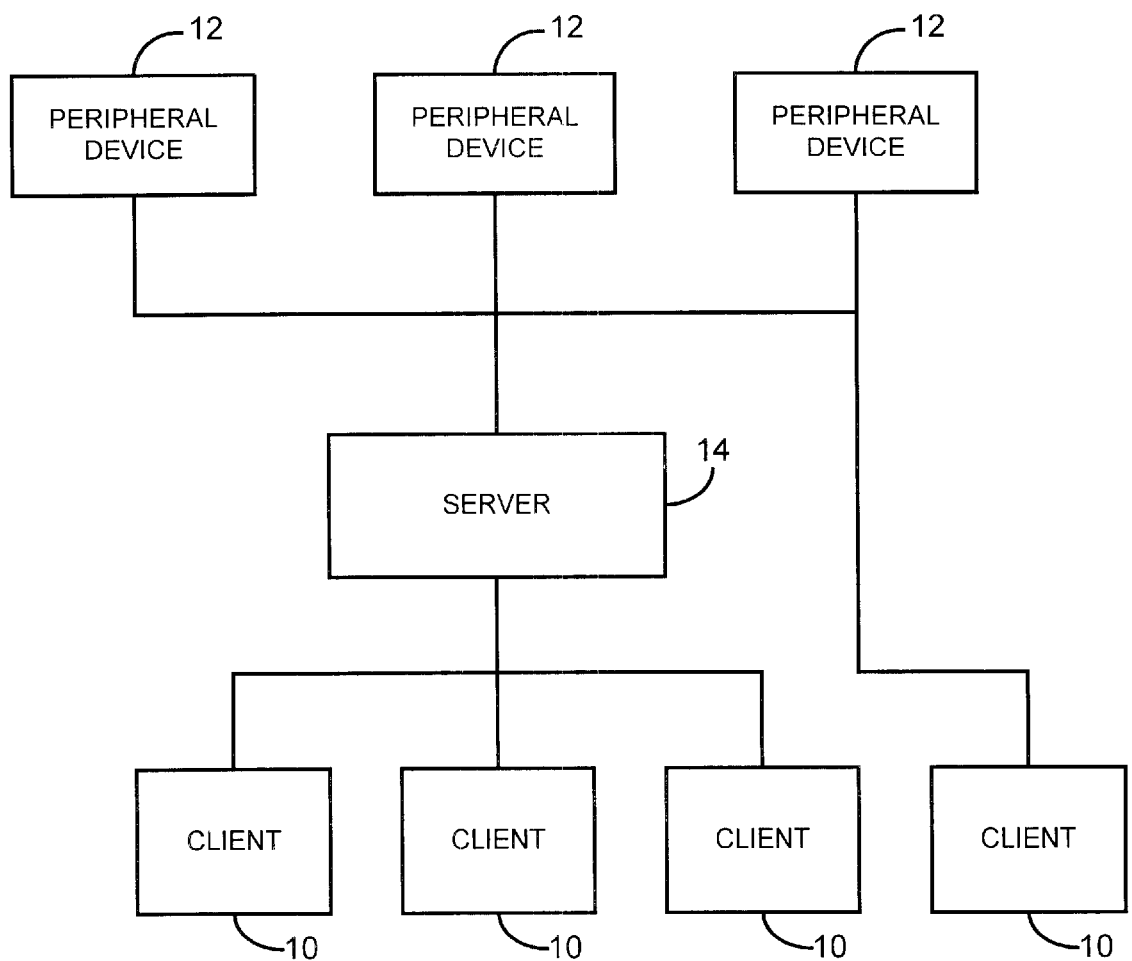

The present invention generally relates to a method and a system for recommending an available network protocol to the user. More particularly, it relates to a method and system for recommending an available network protocol with an operative connection between a client computer and at least one peripheral device.

As networking becomes more common, many users are now connecting multiple peripheral devices to multiple network environments with one or more client computers. This arrangement allows a number of client computers to share the services of these peripheral devices, which can be multiple printers, for example. Such client computers can be personal computers or other computers and will be referred to herein simply as a client. While network experts can easily perform the installation task of connecting these multiple printers to the clients, the installation task is generally too challenging for a typical user. The installation task requires decisions on various topics, such as network protocol or connection types to use, which may be information not generally known to a typical user.

One prior solution provided the user with multiple software tools along with a manual for installing a printer for each particular environment. The user usually had to consult the manual to determine which software tool should be used for the installation process. This method, however, was very time-consuming for the user, and the users were generally confused about what type of protocols or connections they had.

Another prior solution was to provide a single software program. But this solution usually required the user to make a manual choice of the protocol or connection types for a given network configuration, which was information generally not known to a typical user. In addition, this solution also assumed that the user had an adequate understanding of networking to accomplish the installation. Generally, an installation process requires the user to understand the capabilities of the network printer, the nature of the networking environment the client is connected to, and the configuration of the client.

Accordingly, an object of the present invention is to provide an improved method for recommending an available network protocol that is valid and operational during the installation process.

Still another object of the present invention is to provide an improved method for recommending an available network protocol that makes the installation process more user friendly and better fitted for a typical user.

Yet another object of the present invention is to provide an improved method for recommending an available network protocol that makes the installation process less time consuming for the user.

BRIEF SUMMARY OF THE INVENTION

The present invention generally relates to a method and a system for recommending an available network protocol to a user during an installation process. More particularly, it relates to a method and system for recommending an available network protocol with an operative connection between a client computer and at least one peripheral device. The present invention recommends an available network protocol that is operational and valid to the user during the installation process. As a result, the installation process will be less cumbersome for a typical user. In addition, the present invention also avoids having the user needlessly search or install network protocols that are not even available or operational.

The present invention provides a method and system that includes first determining whether a first network protocol in a network protocol list having all possible types of network protocols is supported by the client computer and the peripheral device. If the first network protocol is supported, the next step is to verify communication between the client computer and the peripheral device over the first network protocol. If, on the other hand, the first network protocol is not supported, the next step is to determine whether a next network protocol in the network protocol list is supported by the client computer and the peripheral device. A network protocol with verified communication will be recommended to the user.

Figure 2:
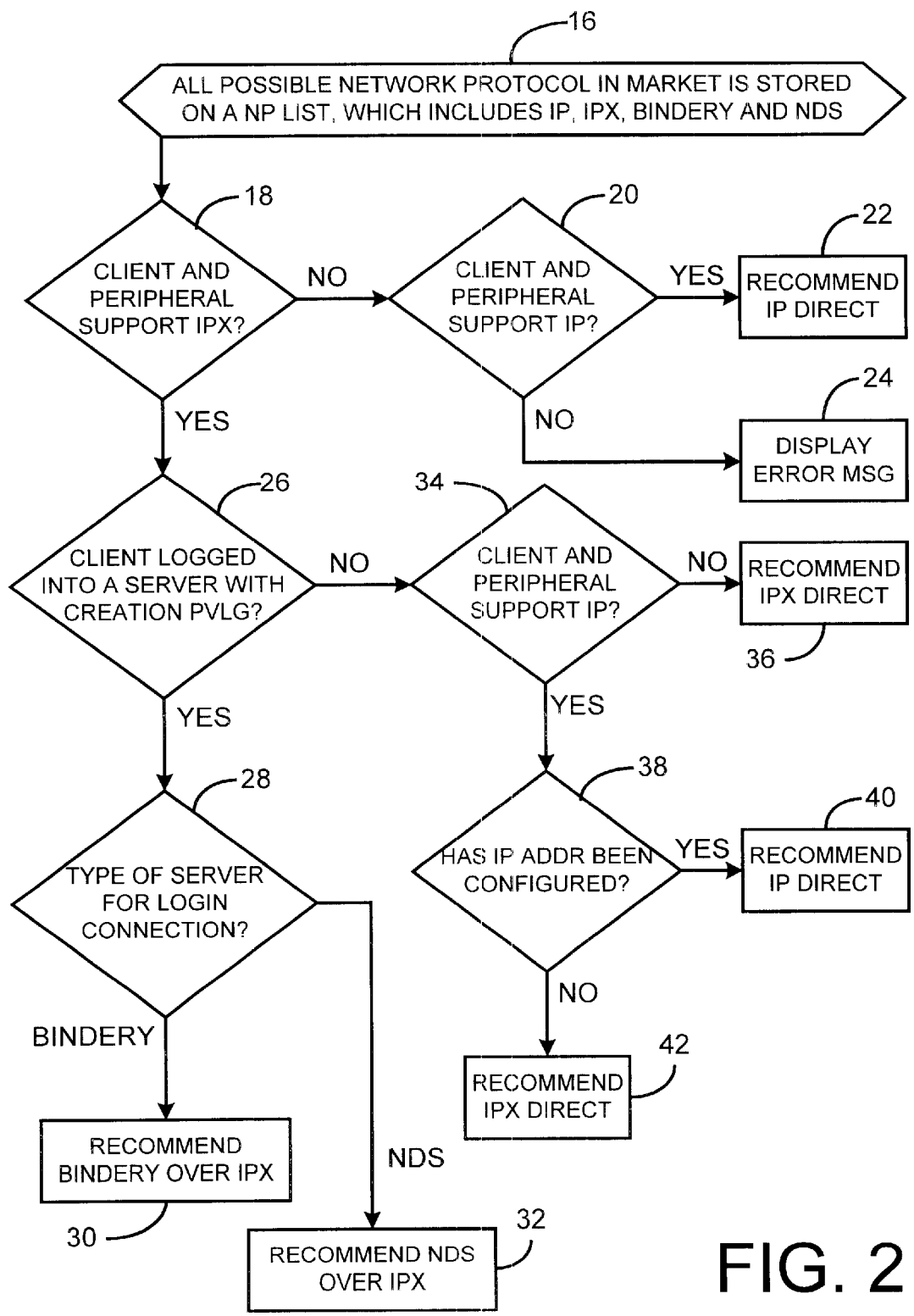

Other objects, features and advantages will become apparent upon reading the following detailed description, in conjunction with the attached drawings, in which:

FIG. 1 is a schematic diagram of an exemplary network architecture in which the present method can be implemented; and, FIG. 2 is a flowchart describing the preferred steps involved in recommending an available network protocol with an operative connection between a client computer and at least one peripheral device.

DETAILED DESCRIPTION

Broadly stated, the present invention is directed to an improved method and system for recommending an available network protocol with operative connections to the user. Since the present invention recommends only an available network protocol that is valid and operational at the time of the installation, users need not search or install network protocols that they will not use. In addition, the present invention creates an installation process that is better suited for a typical user because it is more user friendly.

A block diagram of an exemplary network system in which the present method can be implemented is illustrated in FIG. 1. Although several clients 10 are shown to be connected to multiple peripheral devices 12 via a network server 14, it is only an example of how the clients 10 can be connected to the peripheral devices 12. As shown in FIG. 1, the client 10 can also be directly connected to the peripheral devices. Other connection arrangements are possible and are within the scope of the present invention. In this example, multiple peripheral devices 12 are connected to three clients 10 via a network server 14 and one client via a direct connection.

Great complexity can result during the installation process because of the numerous network environments that are available on the commercial market today. In addition, each peripheral device can also be connected to the network server in various ways. As a result, the present invention determines and displays only the valid options to the user for selection during an installation process.

A flowchart of the preferred steps in recommending the available network protocol with an operative connection between a client and at least one peripheral device is shown in FIG. 2. Because there are four predominant types of print modes in the industry, namely Internet Protocol ("IP") direct, Internetwork Packet Exchange Protocol ("IPX") direct, IPX over a Bindery server, and IPX over a Novell Directory Services ("NDS") server, the present invention is developed using these four types of print modes. However, as technology changes, it is contemplated that the present invention can be implemented for other network protocols as they become available with only slight modifications. The implementation of these other network protocols are within the scope of the present invention. With that in mind, the process shown in FIG. 2 is the preferred method for using the four types of print modes that are currently available, and it is just one way to implement the present invention.

To prepare the process, there should be a network protocol ("NP") list with all the possible network protocols or print modes that are currently available in the industry (block 16). In this case, the IP direct, IPX direct, IPX over a Bindery server, and IPX over a NDS server are included in the list (block 16). A priority order is preferably imposed on the network protocols in the NP list. It is also preferred that the first protocol in the NP list be processed first, which is followed by a next protocol in the list. The network protocol which should have the earliest priority in the NP list depends upon each of the network protocols' characteristics, such as the usage popularity of the network protocols and the information needed during the installation. There may be other factors, and one skilled in the art would appreciate the priority order needed when implementing the present invention given the network protocols that are in the NP list at that time. In the present case, the IPX protocol is preferably processed first within the IPX and IP context. However, as noted earlier, other network protocols can be added or deleted in the NP list as technology changes, which, in turn, can affect the priority order of the network protocols.

The first step is to determine whether the client and the peripheral device support the IPX protocol. If IPX is not supported by either the client or the peripheral device, the next step is to determine whether the client and the peripheral device support the IP protocol (block 20). The IP direct protocol is recommended to the user if it has been determined that the IP protocol is supported (block 22). Otherwise, an error message will be displayed to the user (block 24). The process ends once a recommendation is made to the user.

On the other hand, if it has been determined that the client and the peripheral device support the IPX protocol (block 18), it is next determined whether the client is logged into a server with creation privilege (block 26). Once that is confirmed (block 26), it is next determined what type of server the client computer is logged into (block 28). Whatever the server type may be, it is then recommended to the user (block 30 and 32). Since currently there are only two types of servers used with the IPX protocol, namely bindery and NDS, either the Bindery over IPX option (block 30) or the NDS over IPX option (block 32) is recommended in this case.

If, on the other hand, the client is not logged into a server or has no creation privilege (block 26), the IP is then checked with the client and the peripheral device for support (block 34). The IPX direct protocol option from the NP list will be recommended to the user (block 36) once it has been determined that the IP protocol is not supported by either the client or the peripheral device (block 34).

However, if the IP protocol is supported by the client and the peripheral device (block 34), it must be next confirmed that an IP address has been configured for the IP protocol (block 38). The IP direct is recommended to the user (block 40) if an IP address has been configured (block 38). Alternatively, the IPX direct protocol is recommended (block 42) if an IP address has not been configured (block 38).

While various embodiments of the present invention have been shown and described, other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for recommending an available network protocol having an operative connection between a client computer and at least one peripheral device, said method comprising the steps of:

determining whether a first network protocol in a list of network protocols is supported by the client computer and the peripheral device, wherein said list includes an Internetwork Packet Exchange protocol and a Bindery over Internetwork Packet Exchange protocol and a Novell Directory Services over Internetwork Packet Exchange protocol;

performing the following three determining steps if said first network protocol is an Internetwork Packet Exchange protocol, a Bindery over Internetwork Packet Exchange protocol or a Novell Directory Services over Internetwork Packet Exchange protocol:

determining whether the client computer is logged into a server with creation privilege;

determining whether the client computer is longed into a Bindery server or Novell Directory Services server when the client computer is logged into a server with creation privilege;

determining whether the client computer and the peripheral device support the Internet protocol when the client computer is not logged into a server with creation privilege;

verifying communication between the client computer and the peripheral device over said first network protocol when said network protocol is supported by the client computer and the peripheral device; and, recommending the network protocol with verified communication from said network protocol list to the user.

2. The method according to claim 1 further comprises the step of determining whether a next network protocol in said network protocol list is supported by the client computer and the peripheral device when said first network protocol is not supported by the client computer and the peripheral device.

3. The method according to claim 1 wherein said network protocol list is prioritized with an order.

4. The method according to claim 1 further comprises the step of installing said recommended network protocol onto the client computer.

5. The method according to claim 2 wherein said next network protocol is an Internet protocol.

6. The method according to claim 1 wherein said step of determining whether the client computer is logged into a Bindery server or Novell Directory Services server further comprises the steps:

recommending the Bindery over Internetwork Packet Exchange protocol from the network protocol list when the client computer is logged into a Bindery server; and, recommending the Novell Directory Services over Internetwork Packet Exchange protocol from the network protocol list when the client computer is logged into a Novell Directory Services.

7. The method according to claim 1 wherein said step of determining whether the client computer and the peripheral device support the Internet protocol further comprises the steps of:

recommending the Internetwork Packet Exchange protocol from the network protocol list when the client computer or the peripheral device does not support the Internet protocol; and, determining whether an Internet Protocol address has been configured for the Internet protocol on the client computer when the client computer and the peripheral device support the Internet protocol.

8. The method according to claim 7 further comprising the steps of:

recommending the Internet Packet Exchange protocol from the network protocol list when the Internet Protocol address has not been configured; and recommending the Internet protocol from the network protocol list when the Internet Protocol address has been configured.

9. A system for recommending an available network protocol operatively connected to at least one client computer via a network, comprising:

means for determining whether a first network protocol in a list of network protocols is supported by the client computer and the peripheral device, wherein said list includes an Internetwork Packet Exchange protocol and a Bindery over Internetwork Packet Exchange protocol and a Novell Directory Services over Internetwork Packet Exchange protocol;

said determining means performing the following three determining steps if said first network protocol is an Internetwork Packet Exchange protocol, a Bindery over Internetwork Packet Exchange protocol or a Novell Directory Services over Internetwork Packet Exchange protocol:

determining whether the client computer is logged into a server with creation privilege;

determining whether the client computer is logged into a Bindery server or Novell Directory Services server when the client computer is logged into a server with creation privilege;

determining whether the client computer and the peripheral device support the Internet protocol when the client computer is not logged into a server with creation privilege;

means for verifying communication between the client computer and the peripheral device over the network protocol when said first network protocol is supported by the client computer and the peripheral device;

means for determining whether a second network protocol in the network protocol list is supported by the client computer and the peripheral device; and, means for recommending one of said network protocols with verified communication to the user.

10. A client computer adapted for recommending an available network protocol operatively connected to at least one client computer via a network, comprising:

means for determining whether a first network protocol in a network protocol list of network protocol is supported by the client computer and the peripheral device, wherein said list includes an Internetwork Packet Exchange protocol and a Bindery over Internetwork Packet Exchange protocol and a Novell Directory Services over Internetwork Packet Exchange protocol;

said determining means performing the following three determining steps if said first network protocol is an Internetwork Packet Exchange protocol, a Bindery over Internetwork Packet Exchange protocol or a Novell Directory Services over Internetwork Packet Exchange protocol:

determining whether the client computer is logged into a server with creation privilege;

determining whether the client computer is logged into a Bindery server or Novell Directory Services server when the client computer is logged into a server with creation privilege;

determining whether the client computer and the peripheral device support the Internet protocol when the client computer is not logged into a server with creation privilege;

means for verifying communication between the client computer and the peripheral device over said first network protocol when the network protocol is supported by the client computer and the peripheral device; and, means for recommending a supported network protocol with verified communication to the user.

11. The system according to claim 9 further comprising means for determining whether a second network protocol in said network protocol list is supported by the client computer and the peripheral device when the first network protocol is not supported by the client computer and the peripheral device.

\* \* \* \* \*

UNITED STATES PATENT AND TRADEMARK OFFICE
CERTIFICATE OF CORRECTION

PATENT NO.    : 6,601,094 B1
DATED         : July 29, 2003
INVENTOR(S)   : Duane Mentze et al.

It is certified that error appears in the above-identified patent and that said Letters Patent is hereby corrected as shown below:

Column 4,
Line 27, delete "longed" and insert therefor -- logged --

Signed and Sealed this

Tenth Day of May, 2005

JON W. DUDAS
*Director of the United States Patent and Trademark Office*